US012682476B2

(12) United States Patent
Arya et al.

(10) Patent No.: US 12,682,476 B2
(45) Date of Patent: Jul. 14, 2026

(54) MODIFYING DEPTH MAPS

(71) Applicant: QUALCOMM Incorporated, San Diego, CA (US)

(72) Inventors: Sumeer Arya, Austin, TX (US); Bhupinder Singh Parhar, Princeton, NJ (US); Aydin Emre Guzel, Cambridge (GB); Lei Zhang, Palo Alto, CA (US); Aditya Kulkarni, San Diego, CA (US); Eric Lutz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 18/532,800

(22) Filed: Dec. 7, 2023

(65) Prior Publication Data

US 2025/0191207 A1     Jun. 12, 2025

(51) Int. Cl.
*G06T 7/593*          (2017.01)
(52) U.S. Cl.
CPC .... *G06T 7/593* (2017.01); *G06T 2207/10028* (2013.01)
(58) Field of Classification Search
None
See application file for complete search history.

(56) References Cited

U.S. PATENT DOCUMENTS

| | | | |
|---|---|---|---|
| 2011/0274366 A1 | 11/2011 | Tardif | |
| 2012/0056982 A1* | 3/2012 | Katz | G06F 3/0304 |
| | | | 348/43 |
| 2018/0176543 A1 | 6/2018 | Wan | |
| 2018/0309974 A1 | 10/2018 | Varekamp et al. | |
| 2020/0327686 A1 | 10/2020 | Zatzarinni et al. | |
| 2021/0390720 A1* | 12/2021 | Dmitriev | G06T 7/579 |
| 2023/0290070 A1* | 9/2023 | Urella | G06V 20/64 |

* cited by examiner

*Primary Examiner* — Darryl V Dottin
(74) *Attorney, Agent, or Firm* — Polsinelli LLP/QUALCOMM Incorporated

(57)          ABSTRACT

Systems and techniques are described herein for modifying depth maps. For instance, a method for modifying depth maps is provided. The method may include obtaining a depth map comprising a plurality of depth values; obtaining a plurality of confidence values comprising a respective confidence value for each depth value of the plurality of depth values; dividing the depth map into a plurality of depth sections; determining, based on the plurality of confidence values, a plurality of section confidences comprising a respective section confidence for each of the plurality of depth sections; and modifying the depth map based on the plurality of section confidences.

18 Claims, 9 Drawing Sheets

500

| 1 | 2 | 1 |
|---|---|---|
| 2 | 4 | 2 |
| 1 | 2 | 1 |

| 0.8 | 0.6 | 0.9 | 1 |
|-----|-----|-----|-----|
| 0.8 | 0.2 | 0.2 | 0.6 |
| 0.5 | 0.1 | 0.1 | .07 |
| 0.4 | 0.4 | 0.6 | 1 |

FIG. 6

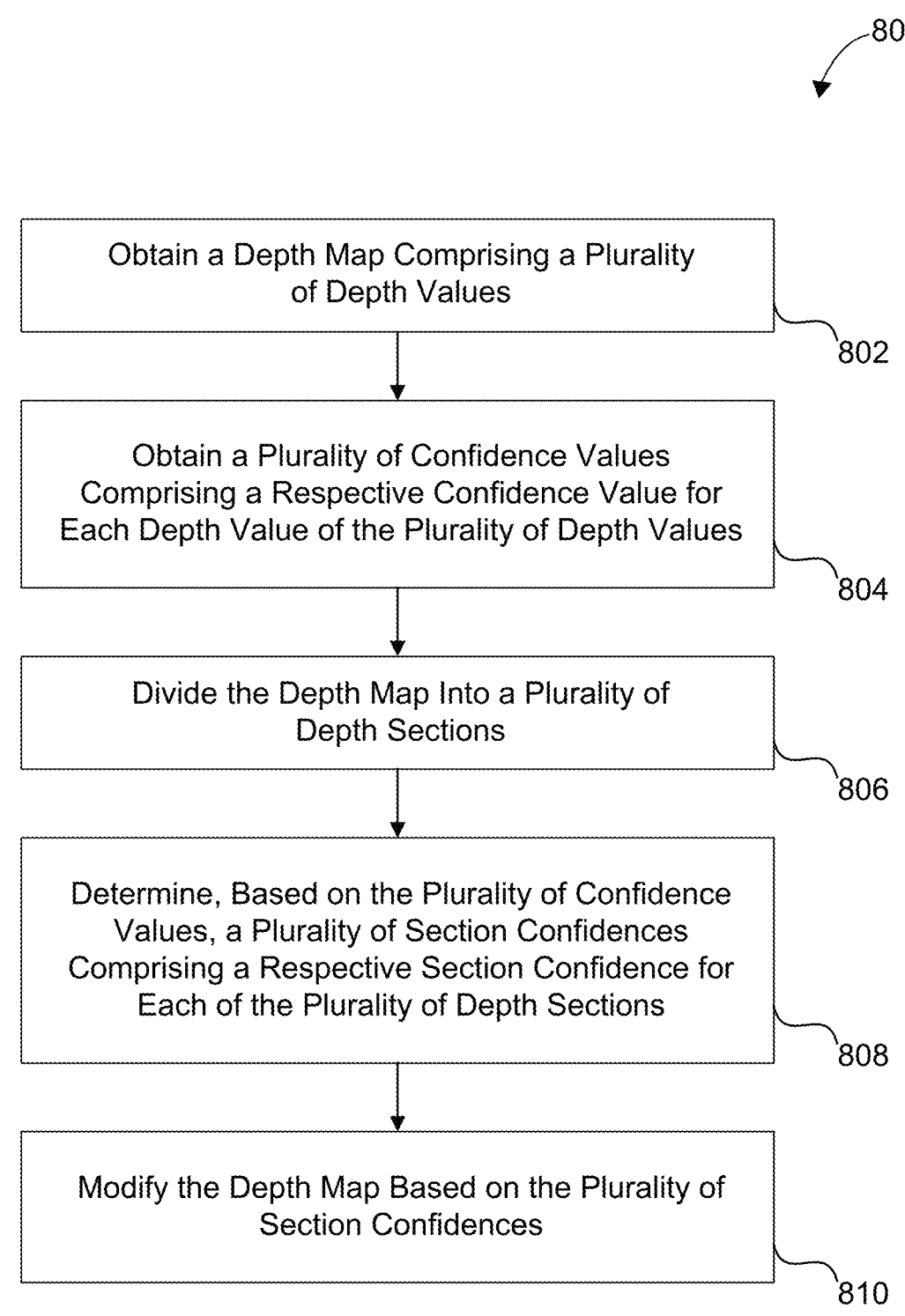

800

Obtain a Depth Map Comprising a Plurality of Depth Values

802

Obtain a Plurality of Confidence Values Comprising a Respective Confidence Value for Each Depth Value of the Plurality of Depth Values

804

Divide the Depth Map Into a Plurality of Depth Sections

806

Determine, Based on the Plurality of Confidence Values, a Plurality of Section Confidences Comprising a Respective Section Confidence for Each of the Plurality of Depth Sections

808

Modify the Depth Map Based on the Plurality of Section Confidences

MODIFYING DEPTH MAPS

TECHNICAL FIELD

The present disclosure generally relates to depth maps. For example, aspects of the present disclosure include systems and techniques for modifying depth maps, for example, by smoothing depth values and/or filling depth holes.

BACKGROUND

A device may determine distances between the device and points in an environment of the device. In the present disclosure, a distance between a device and a point in the environment may be referred to as a "depth." The device may determine a number (e.g., hundreds or thousands) of depths and arrange the depths as depth values of a depth map. The depth map may be a two-dimensional map of depth values. The depth map may be representation of a three-dimensional environment (e.g., from the perspective of the device). For example, an environment may be modeled by projecting a respective ray from a focal point of the device through each depth value of a depth map (each ray having a length corresponding to the depth value). There are a number of techniques for determining depths including, as examples, time-of-flight (ToF) techniques, active-depth-sensing techniques, and stereo-vision techniques.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for modifying depth maps. According to at least one example, a method is provided for modifying depth maps. The method includes: obtaining a depth map comprising a plurality of depth values; obtaining a plurality of confidence values comprising a respective confidence value for each depth value of the plurality of depth values; dividing the depth map into a plurality of depth sections; determining, based on the plurality of confidence values, a plurality of section confidences comprising a respective section confidence for each of the plurality of depth sections; and modifying the depth map based on the plurality of section confidences.

In another example, an apparatus for modifying depth maps is provided that includes at least one memory and at least one processor (e.g., configured in circuitry) coupled to the at least one memory. The at least one processor configured to: obtain a depth map comprising a plurality of depth values; obtain a plurality of confidence values comprising a respective confidence value for each depth value of the plurality of depth values; divide the depth map into a plurality of depth sections; determine, based on the plurality of confidence values, a plurality of section confidences comprising a respective section confidence for each of the plurality of depth sections; and modify the depth map based on the plurality of section confidences.

In another example, a non-transitory computer-readable medium is provided that has stored thereon instructions that, when executed by one or more processors, cause the one or more processors to: obtain a depth map comprising a plurality of depth values; obtain a plurality of confidence values comprising a respective confidence value for each depth value of the plurality of depth values; divide the depth map into a plurality of depth sections; determine, based on the plurality of confidence values, a plurality of section confidences comprising a respective section confidence for each of the plurality of depth sections; and modify the depth map based on the plurality of section confidences.

In another example, an apparatus for modifying depth maps is provided. The apparatus includes: means for obtaining a depth map comprising a plurality of depth values; means for obtaining a plurality of confidence values comprising a respective confidence value for each depth value of the plurality of depth values; means for dividing the depth map into a plurality of depth sections; means for determining, based on the plurality of confidence values, a plurality of section confidences comprising a respective section confidence for each of the plurality of depth sections; and means for modifying the depth map based on the plurality of section confidences.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 6 is a diagram illustrating examples of various concepts related to systems and techniques for modifying depth values according to various aspects of the present disclosure;

FIG. 8 is a flow diagram illustrating an example process for modifying depth values, in accordance with aspects of the present disclosure;

DETAILED DESCRIPTION

Figure 1:
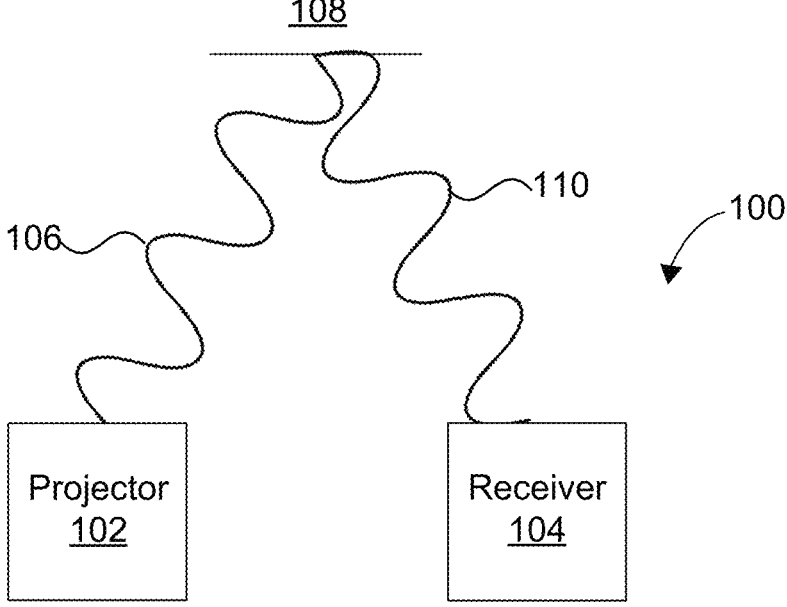
FIG. 1 is a diagram illustrating an example time of flight (ToF) camera, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As previously noted, there are a number of techniques that can be used to determine distances between the devices and points in an environment. Such techniques include time-of-flight (ToF) techniques, active-depth-sensing techniques, and stereo-vision techniques. Such devices may generate depth maps including a number (e.g., hundreds or thousands) of depths arranged into a two-dimensional array. A depth map may represent a three-dimensional environment (e.g., from the perspective of the device).

In some cases, one or more depth values of a depth map may be inaccurate. For example, multi-path interference may affect depth values determined by a ToF or active-depth sensing technique. In order to correct inaccurate depth values, some devices smooth depth values. For example, some devices perform a spatial averaging (or weighted averaging) on depth maps. Such smoothing may cause depth values within a small area (e.g., corresponding to an object or surface in an environment) to be more uniform. When the depth values are from a common object or surface, the smoothed depths may be more accurate.

Smoothing a depth map may be computationally intense. For example, to smooth one depth value, a smoothing technique may read eight neighboring depth values from memory and use all eight neighboring depth values to smooth the one depth value (e.g., by determining the smoothed depth value based on a weighted average of the one depth value and the eight neighboring depth values). Further, in some cases, smoothing may involve multiple iterations such that depth values may be smoothed multiple times. For example, a first depth value may be smoothed a first time based on its neighboring depth values. Subsequently the neighboring depth values may be similarly smoothed (based on their respective neighboring depth values). The smoothing of the neighboring depth values may change the neighboring depth values. The first depth value may be smoothed again based on the smoothed neighboring depth values. The second smoothing of the first depth value may result in a different first depth value than the first smoothing because the neighboring depth values were changed when the neighboring depth values were smoothed. Such iterative smoothing may include several iterations of smoothing.

In some cases, depth values may be associated with confidence values. For instance, the depth technique that determined the depth values may determine a confidence value for each depth value. The confidence values may be arranged in a confidence map corresponding to the depth map. For instance, each confidence value of a confidence map may correspond to a depth value of the depth map. As an example of generating confidence values, a ToF technique may determine a confidence of a depth value based on a return signal on which the depth value was based (e.g., based on a correlation between the projected signal and the return signal and/or based on a signal strength of the return signal). As another example, an active-depth-sensing technique may determine a confidence value of a depth value based on a match score (e.g., a score describing a correlation between a projected pattern and the pattern as captured in an image of the environment). As another example, a stereo-vision technique may determine a confidence value of a depth value based on a cost (e.g., a cost describing a correlation between features of stereoscopically-paired images). In the present disclosure, depth values associated with low confidence values may be referred to as "low-confidence depths" or "low-confidence depth values." Similarly, depth values associated with high confidence values may be referred to as "high-confidence depths" or "high-confidence depth values."

To reduce the computational intensity of depth smoothing, some depth-smoothing techniques may smooth low-confidence depth values and skip smoothing high-confidence depth values. For example, if the depth technique used to determine a first depth value is confident in the first depth value (e.g., as indicated by the first depth value corresponding to a high confidence value), some techniques may determine to not smooth the first depth value. However, if the depth technique used to determine a second depth value is not confident in the second depth value (e.g., as indicated by the second depth value corresponding to a low confidence value), some techniques may determine to smooth the second depth value. In this way, high-confidence depth values remain the same while depth low-confidence depth values are smoothed. Smoothing low-confidence depth values may tend to improve the accuracy of the low-confidence depth values (e.g., by causing the low-confidence depth values to be more similar to their respective neighbors, which may cause the low-confidence depth values to be more accurate when the low-confidence depth values and their respective neighbors are all indicative of depths between the depth sensor and the same object or surface).

Systems, apparatuses, methods (also referred to as processes), and computer-readable media (collectively referred to herein as "systems and techniques") are described herein for confidence-guided modifying of depth values. For example, the systems and techniques described herein may filter depth values and/or fill depth holes based on confidence values. For instance, the systems and techniques may determine to skip smoothing of sections of a depth map and/or to skip filling of depth holes within sections of the depth map.

For example, the systems and techniques may divide a depth map into depth sections and determine a section confidence for each of the depth sections. A section confidence of a depth section may be based on a statistical measure of the confidence values corresponding to the depth values of the depth section. For instance, the systems and techniques may divide a confidence map into confidence sections, each of the confidence sections may correspond to a respective depth section of the depth map. For example, the confidence map may be divided into confidence sections in the same way that the depth map was divided into depth sections. The systems and techniques may determine an average of the confidence values of a confidence section as the section confidence of the corresponding depth section. As another example, the systems and techniques may determine the minimum of the confidence values of a confidence section as the section confidence of the corresponding depth section. In the present disclosure, a depth section of a depth map that corresponds to confidence section of a confidence map that has a confidence that is greater than a threshold may be referred to as a "high-confidence section" or a "high-confidence depth section." Similarly, a depth section of a depth map that corresponds to confidence section of a confidence map that has a confidence that is less than a threshold may be referred to as a "low-confidence section" or a "low-confidence depth section."

Having determined the section confidences of the various sections of a depth map, the systems and techniques may determine whether to smooth the depth values of each depth section based on the section confidences. For example, if a first depth section has a section confidence that is greater than a threshold (e.g., if the first depth section is a high-confidence section), the systems and techniques may determine to skip smoothing each of the depth values of the first section. Alternatively, if a second section has a section confidence that is less than the threshold (e.g., if the second depth section is a low-confidence section), the systems and techniques may determine to smooth each of the depth values of the second section.

Additionally or alternatively, the systems and techniques may determine whether to fill depth holes in each depth section based on the section confidences. A depth map may lack certain depth values, for example, as a result of warping of a depth map or sampling depth measurements by a depth sensor at a resolution that is lower than the desired resolution of the desired depth map. Positions of the depth map that lack depth values may be referred to, in the present disclosure, as "depth holes." The systems and techniques may fill depth holes, for example, by smoothing, as described above, to generate depth values based on neighboring depth values. To conserve operations, the systems and techniques may determine to skip filling holes in high-confidence sections.

Compared to techniques that determine whether to smooth each depth value individually, the systems and techniques may conserve computational time and/or operations. For example, some techniques may check a confidence value of each depth value of a depth map, one at a time (e.g., according to a raster pattern), and determine whether to smooth the depth value based on the confidence value corresponding to the depth value. This may involve checking each confidence value, one at a time.

In contrast, the systems and techniques may divide a depth map into depth sections and determine a section confidence for each depth section. The systems and techniques may check each depth section as a whole to determine whether to smooth the depth values of the section as a whole. The systems and techniques may determine the depth sections, and the section confidences based on the depth map at a less-than-full resolution. For example, the systems and techniques may receive a depth map and filter the depth map at several resolutions (e.g., at a first resolution, then at successively lower resolutions). During the reading and down-scaling of the depth map to a lower resolution, the confidence values are available. Accordingly, the systems and techniques may determine the section confidences while the confidence values are available during the reading and down-scaling of the depth map. The systems and techniques may then skip smoothing of low-confidence sections. By skipping smoothing of whole sections, the systems and techniques may conserve computational time and/or operations.

In some aspects, the systems and techniques may dynamically determine the sizes of the depth sections. For example, the systems and techniques may determine a count of confidence values of a confidence map that are below a threshold. The count of confidence values in the confidence map that are below the threshold may correspond to a count of low-confidence depth values in a depth map corresponding to the confidence map. The systems and techniques may determine a size of the depth sections into which the systems and techniques will divide the depth map based on the count of low-confidence depth values. For example, if the count of low-confidence depth values is between 25% and 50% of the total number of depth values in the depth map, the systems and techniques may determine to divide the depth map into sections of a first size (e.g., 64 depth values by 64 depth values). Further if the count of low-confidence depth value is between 50% and 75% of the total number of depth values in the depth map, the systems and techniques may determine to divide the depth map into sections of a second size (e.g., 32 depth values by 32 depth values).

Various aspects of the application will be described with respect to the figures below.

FIG. 1 is a diagram illustrating an example time of flight (ToF) camera 100, according to various aspects of the present disclosure. ToF camera 100 may be a direct Time-of-Flight (dToF) depth camera or an indirect Time-of-Flight (iToF) depth camera.

As a dToF depth camera, ToF camera 100 may measure a timing difference (e.g., a time of flight) between when emitted light pulse 106 is emitted by projector 102 and when reflected light pulse 110 received by receiver 104 (e.g., after emitted light pulse 106 has been reflected by object 108 in an environment). Although illustrated as spread apart in FIG. 1, projector 102 and receiver 104 may be collocated, beside one another, or interspersed with one another. As a dToF depth camera, ToF camera 100 may, based on the time of flight and the speed of light, calculate a distance between the dToF depth camera and object 108 in the environment.

As an iToF depth camera, ToF camera 100 may measure a phase difference between emitted light pulse 106 as emitted by projector 102 and reflected light pulse 110 as received by receiver 104. ToF camera 100 may relate the phase difference to a time of flight of emitted light pulse 106 between emission and reception, based on the speed of light and the frequency of the light pulse. As an iToF depth camera, ToF camera 100 may, based on the time of flight and the speed of light, calculate a distance between the iToF depth camera and object 108 in the environment.

ToF camera 100 (as either a dToF depth camera or an iToF depth camera) may emit one more light pulses into the environment and determine depth information relative to the environment. For example, the depth camera may emit one or more light pulses (from projector 102) and receive and focus reflected light pulses onto an array of sensors (of receiver 104). Using the array of sensors, the depth camera may determine depths for each of a number of points within a field of view of the depth camera. The number of depths may be a depth representation of the environment.

Figure 2:
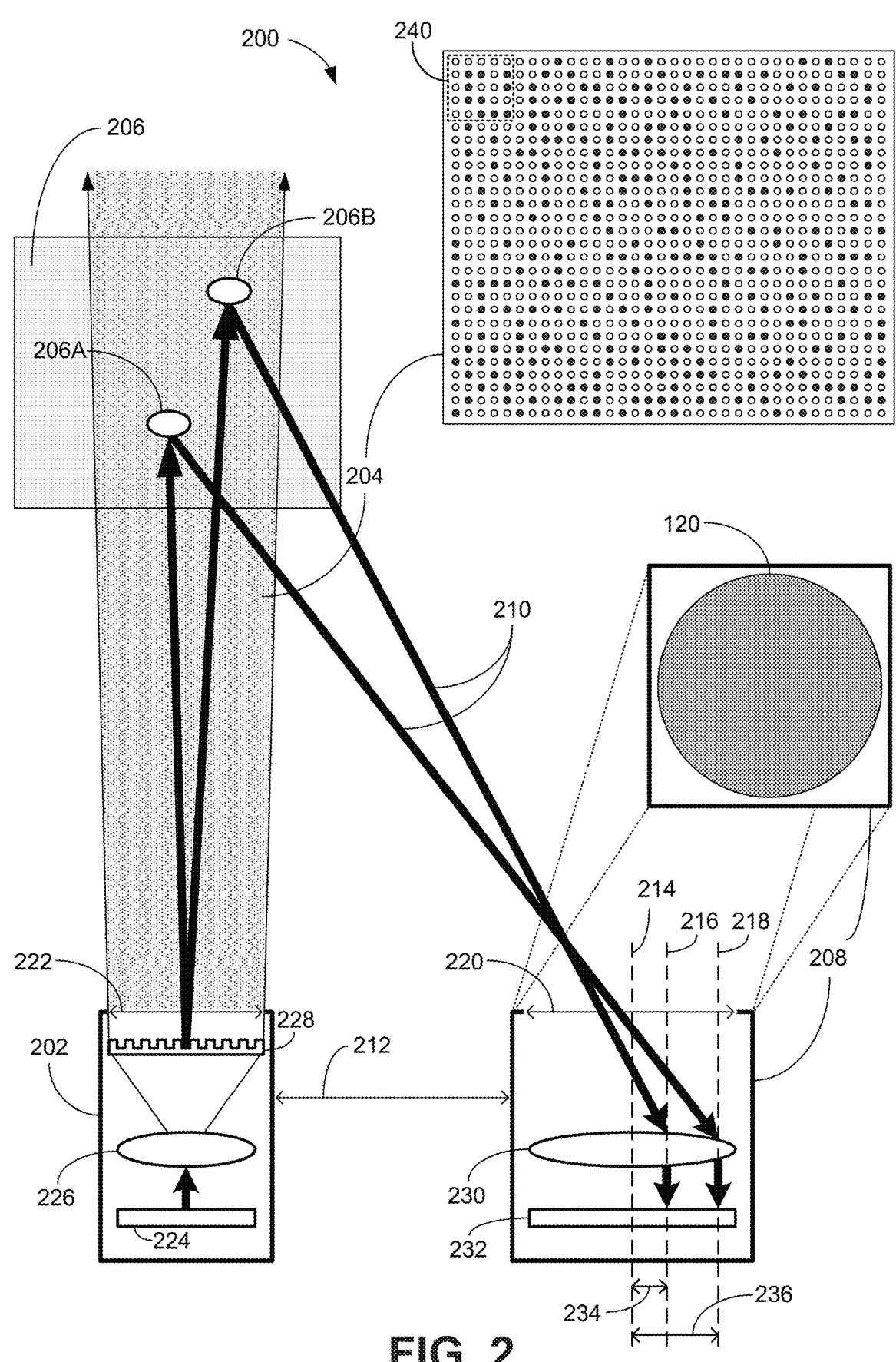
FIG. 2 is a depiction of an example active depth-sensing system configured to use a pattern of dots for determining depths of objects in a scene, according to various aspects of the present disclosure.

FIG. 2 is a depiction of an example active depth-sensing system 200 (which may be referred to alternatively as a structured-light system) configured to use a pattern 204 of dots for determining depths of objects 206A and 206B in a scene 206, according to various aspects of the present disclosure. Active depth-sensing system 200 may be used to generate a depth map (not pictured) of a scene 206. For example, the scene 206 may include an object (e.g., a face), and the active depth sensing active depth-sensing system 200 may be used to generate a depth map including a plurality of depth values indicating depths of portions of the object for identifying or authenticating the object (e.g., for face authentication). Active depth-sensing system 200 includes a projector 202 and a receiver 208. Projector 202 may be referred to as a "structured light source", "transmitter," "emitter," "light source," or other similar term, and should not be limited to a specific transmission component. Throughout the following disclosure, the terms projector, transmitter, and light source may be used interchangeably. Receiver 208 may be referred to as a "detector," "sensor," "sensing element," "photodetector," and so on, and should not be limited to a specific receiving component.

Projector 202 may be configured to project or transmit a pattern 204 of dots (e.g., light points or shapes) onto scene 206. The white circles in pattern 204 indicate where no light is projected, and the black circles in pattern 204 indicate where light is projected. The disclosure may alternatively refer to the pattern 204 as a codeword distribution or a distribution, where defined portions of the pattern 204 are codewords (also referred to as codes).

Projector 202 includes one or more light sources 224 (such as one or more lasers). In some implementations, the one or more light sources 224 includes a laser array. In one illustrative example, each laser may be a vertical cavity surface emitting laser (VCSEL). In another illustrative example, each laser may include a distributed feedback (DFB) laser. In another illustrative example, the one or more light sources 224 may include a resonant cavity light emitting diodes (RC-LED) array. In some implementations, the projector may also include a lens 226 and a light modulator 228. Projector 202 may also include an aperture 222 from which the transmitted light escapes projector 202. In some implementations, projector 202 may further include a diffractive optical element (DOE) to diffract the emissions from one or more light sources 224 into additional emissions. In some aspects, the light modulator 228 (which may adjust the intensity of the emission) may include a DOE.

In projecting pattern 204 of dots onto scene 206, projector 202 may transmit one or more lasers from light source 224 through lens 226 (and/or through a DOE and/or light modulator 228) and onto objects 206A and 206B in scene 206. Projector 202 may be positioned on the same reference plane as receiver 208, and projector 202 and receiver 208 may be separated by a known distance, which may be referred to as baseline 212.

In some implementations, the light projected by projector 202 may be infrared (IR) light. IR light may include portions of the visible light spectrum and/or portions of the light spectrum that is not visible to the naked eye. In one example, IR light may include near infrared (NIR) light, which may or may not include light within the visible light spectrum, and/or IR light (such as far infrared (FIR) light) which is outside the visible light spectrum. The term IR light should not be limited to light having a specific wavelength in or near the wavelength range of IR light. Further, IR light is provided as an example emission from the projector. In the following description, other suitable wavelengths of light may be used. For example, light in portions of the visible light spectrum outside the IR light wavelength range or ultraviolet (UV) light may be used.

Scene 206 may include objects at different depths from active depth-sensing system 200 (such as from projector 202 and receiver 208). For example, objects 206A and 206B in scene 206 may be at different depths. Receiver 208 may be configured to receive, from scene 206, reflections 210 of the transmitted pattern 204 of dots. To receive reflections 210, receiver 208 may capture a frame. When capturing the frame, receiver 208 may receive reflections 210, as well as (i) other reflections of pattern 204 of dots from other portions of scene 206 at different depths, (ii) ambient light, and (iii) noise. In the present disclosure, the terms "frame" and "image" may be used interchangeably to refer to what is captured by receiver 208. The frame, or image, may or may not be, or include, a visible image but may rather include intensity values including intensities of reflections 210. The intensity values may be based on reflections 210 of visible light, IR light, or UV light.

In some implementations, receiver 208 may include a lens 230 to focus or direct the received light (including reflections 210 from the objects 206A and 206B) on to a sensor 232 of receiver 208. Receiver 208 also may include an aperture 220. Assuming for the example that only reflections 210 are received, depths of the objects 206A and 206B (e.g., distances between projector 202 or receiver 208 and objects 206A and 206B respectively) may be determined based on baseline 212 and displacement and distortion of dots of pattern 204 in reflections 210. In some cases, an intensity of reflections 210 may also be used to determine depths of objects 206A and 206B. For example, a distance 234 along sensor 232 from location 216 to a center 214 of sensor 232 may be used in determining a depth of object 206B in scene 206. Similarly, a distance 236 along sensor 232 from a location 218 to center 214 may be used in determining a depth of object 206A in scene 206. The distance along sensor 232 may be measured in terms of number of pixels of sensor 232 or a unit of distance (such as millimeters).

In some implementations, sensor 232 may include an array of photodiodes (such as avalanche photodiodes) for capturing a frame. To capture the frame, each photodiode in the array may capture the light that hits the photodiode and may provide a value indicating the intensity of the light (a capture value). The frame therefore may be an array of capture values provided by the array of photodiodes. In addition or alternative to sensor 232 including an array of photodiodes, sensor 232 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

Sensor 232 may include at least a number of pixels equal to the number of possible dots in pattern 204. For example, the array of photodiodes or the CMOS sensor may include at least a number of photodiodes or a number of pixels, respectively, corresponding to the number of possible dots in pattern 204. In some implementations, sensor 232 may include more pixels than the number of possible dots of pattern 204. For example, in some cases, sensor 232 may include five or ten times as many pixels as pattern 204 includes dots. If light source 224 transmits IR light (such as NIR light at a wavelength of, e.g., 940 nanometers (nm)), sensor 232 may be an IR sensor to receive the reflections of the NIR light.

As illustrated, distance 234 (corresponding to a reflection 210 from object 206B) is less than distance 236 (corresponding to a reflection 210 from object 206A). Using triangulation based on baseline 212 and distance 234 and distance 236, the differing depths of objects 206A and 206B in scene 206 may be determined and a depth map of scene 206 may be generated. Determining the depths may further be based on a displacement or a distortion of pattern 204 in reflections 210.

In some implementations, projector 202 may be configured to project a fixed light distribution, in which case the same distribution of light is used in every instance for active depth sensing. In some implementations, projector 202 may be configured to project a different pattern of light at different times. For example, projector 202 may be configured to project a first pattern of light at a first time and project a second pattern of light at a second time. A resulting depth map of one or more objects in a scene may thus be based on one or more reflections of the first pattern of light and one or more reflections of the second pattern of light.

Although a number of separate components are illustrated in FIG. 2, one or more of the components may be implemented together or include additional functionality. All described components may not be required for active depth-sensing system 200, or the functionality of components may be separated into separate components. Additional components not illustrated also may exist. For example, receiver 208 may include a bandpass filter to allow signals having a determined range of wavelengths to pass onto sensor 232 (thus filtering out signals with a wavelength outside of the range). In this manner, some incidental signals (such as ambient light) may be prevented from being received as interference during the captures by sensor 232. The range of the bandpass filter may be centered at the transmission wavelength for projector 202. For example, if projector 202 is configured to transmit NIR light with a wavelength of 940 nm, receiver 208 may include a bandpass filter configured to allow NIR light having wavelengths within a range of, for example, 920 nm to 960 nm. Therefore, the examples described regarding FIG. 2 is for illustrative purposes.

Figure 3:
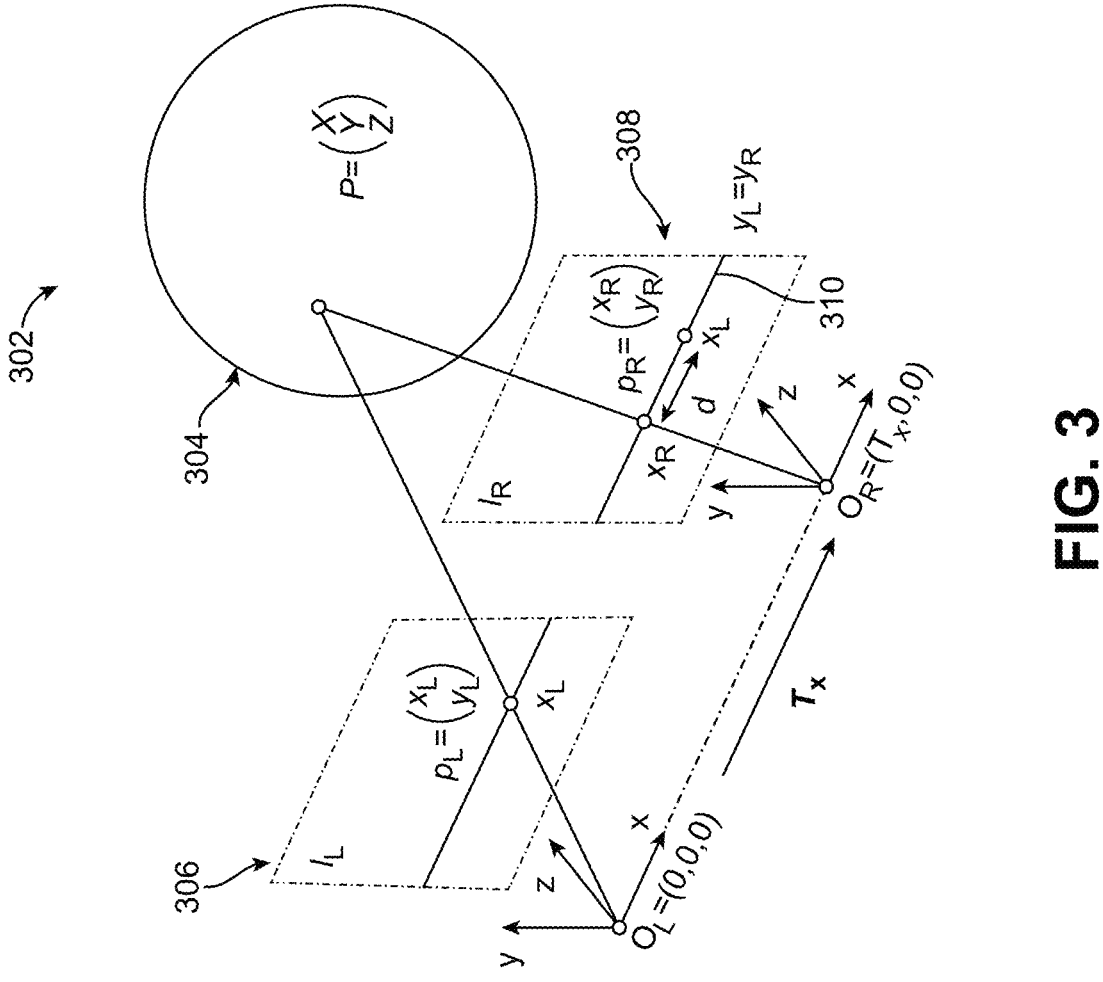
FIG. 3 illustrates two example images of a single scene captured from different camera positions, according to various aspects of the present disclosure.

FIG. 3 illustrates two example images, image 306 and image 308 (also denoted in FIG. 3 as image IL and image IR), of a single scene 302 captured from different camera positions, according to various aspects of the present disclosure. The different camera positions are marked as left and right "origin" points, $O_L$ and $O_R$, which are offset by a distance $T_x$. Because of the offset $T_x$, the same point P of object 304 appears at different pixel locations $p_L$ and $p_R$ within the two images 306 ($I_L$) and 308 ($I_R$). As can be seen, the x-axis coordinate $x_R$ in image 308 ($I_R$), corresponding to point $P_R$ in image 308 ($I_R$), is offset along epi-polar line 310 by disparity d from a coordinate $x_L$, where the coordinate $x_L$ corresponds to the position of the point P in the image 306 ($I_L$). This disparity in pixel locations (also referred to as discrepancy) may be used to determine an approximate distance from the cameras to the point P on object 304 in scene 302. By knowing the stereo camera geometry and applying such an analysis to each point in the images, a depth map of the scene may be generated.

In order to determine the disparity d, a system may determine that the pixel location $p_R$ in the image 308 ($I_R$) corresponds to the pixel location $p_L$ in the image 306 ($I_L$), for example, by comparing a window of pixels including pixels at, and around, the pixel location $p_L$ to a number of windows of pixels in image 308 ($I_R$). An example of such a window-based comparison technique is described with respect to FIG. 4. For example, a passive stereo-vision system may determine epi-polar line 310 in the image 308 ($I_R$). Epi-polar line 310 may be a defined by a ray projected from origin point $O_L$ to the point P as viewed in in the image 306 ($I_R$). The passive stereo-vision system may compare the window of pixels including pixels at, and around, the pixel location $p_L$ to similarly-sized windows along epi-polar line 310.

Figure 4:
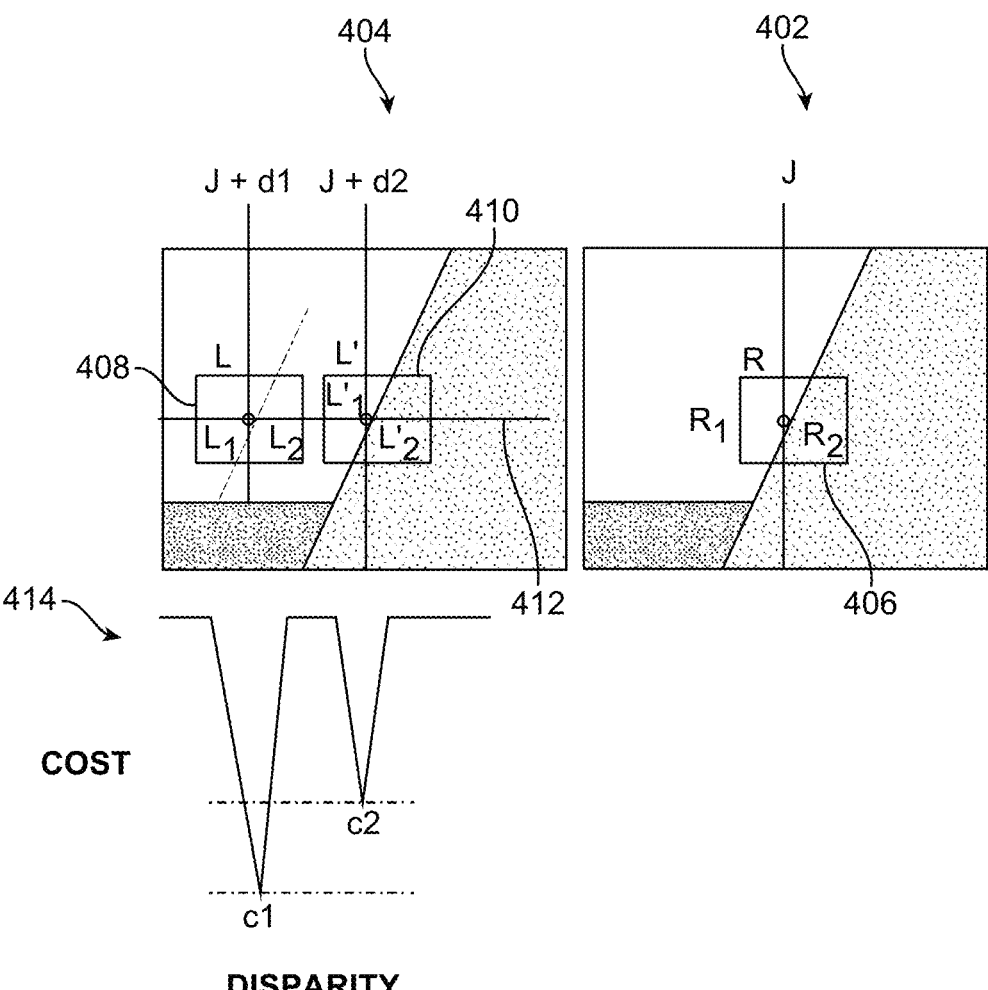
FIG. 4 illustrates two example images and an example associated cost function, according to various aspects of the present disclosure.

FIG. 4 illustrates two example images, image 402 (which may be a "right image" or a "reference image") and image 404 (which may be a "left image"), and an example associated cost function 414, according to various aspects of the present disclosure. To compare windows between image 402 and image 404, a window 406 of pixels from the image 402 may be selected. Window 406 of pixels from image 402 may be compared to one or more windows of pixels from image 404. In some cases, window 406 may be compared to similarly-sized windows (e.g., all similarly-sized windows) along an epi-polar line 412 of image 404.

The cost function 414 shown in FIG. 4 is representative of a similarity between window 406 and similarly-sized windows along epi-polar line 412 of image 404 as a function of disparity. The similarity between windows may be based on similarities between respective red, green, blue, and/or intensity (or brightness or luminance) values of pixels included in the respective windows. The lower the value of cost function 414 for a particular disparity, the higher the degree of similarity is between window 406 and a window of image 402 at the corresponding disparity. For example, cost function 414 includes two minima, c1 and c2. The minima c1 corresponds to a disparity d1, which corresponds to a comparison between window 406 and candidate window 408 of image 404. The minima c2 corresponds to a disparity d2 which corresponds to a comparison between window 406 and candidate window 410 of image 404.

A disparity map may be a two-dimensional map of disparities. The two-dimensional map may relate to an image (e.g., image 306 of FIG. 3). For instance, a two-dimensional disparity map may include a resolution that is the same (or substantially the same in some cases) as a corresponding image, with a respective disparity value for each pixel of the image. In one illustrative example, a disparity map may be generated by determining a respective disparity for each pixel of a number of pixels (e.g., all, or most, of the pixels) of an image (e.g., by scanning windows across epi-polar lines of a stereoscopically-paired image and determining a disparity for each of the number of pixels). Each value of the disparity map may represent a disparity (e.g., disparity d of FIG. 3). A depth map may be derived from a disparity map based on the three-dimensional geometry of a scene (e.g., scene 302 of FIG. 3) including a distance between the cameras which captured the images (e.g., the distance $T_x$ of FIG. 3).

A depth map may be a representation of three-dimensional information (e.g., depth information). For example, a depth map may be a two-dimensional map of values (e.g., pixel values) representing depths. The values of the depth map may correspond to pixels in a corresponding image (e.g., image 306 of FIG. 3). For instance, the depth map may have a resolution that is the same or substantially the same as the corresponding image, with each depth value of the depth map representing a depth, or distance, between an origin point (e.g., origin point $O_L$ of FIG. 3) and points (e.g., point P of FIG. 3). In some cases, each pixel in the depth map may have one depth value. Because a depth map is based on a disparity map, in some cases, each pixel of a disparity may have one disparity.

Figure 5:
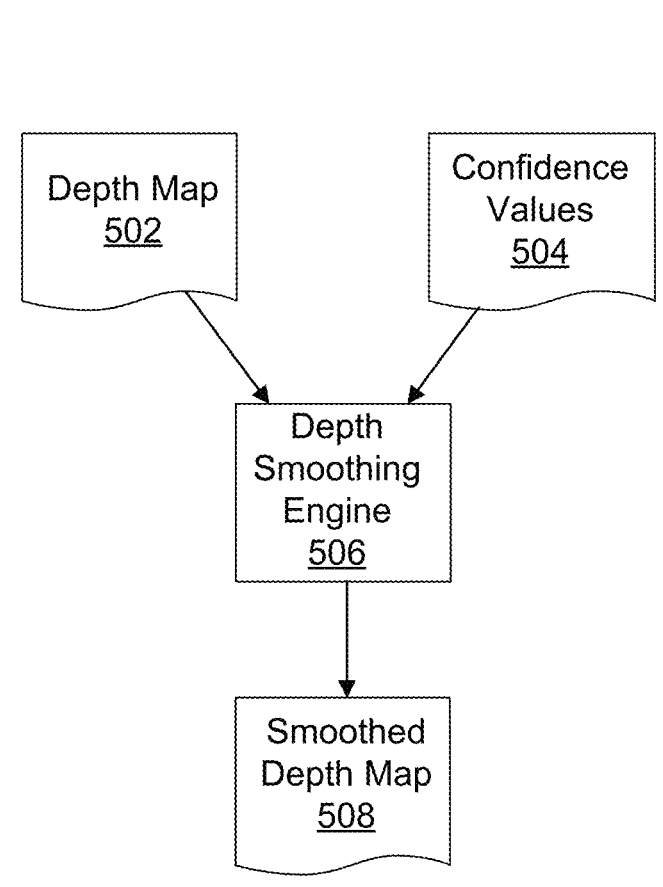
FIG. 5 is a block diagram illustrating an example system for modifying depth values of a depth map based on confidence values, according to various aspects of the present disclosure.

FIG. 5 is a block diagram illustrating an example system 500 for modifying depth values of a depth map 502 based on confidence values 504, according to various aspects of the present disclosure. In general, system 500 may obtain depth map 502 and confidence values 504 and modify depth values of depth map 502 based on confidence values 504 to generate smoothed depth map 508.

Depth map 502 may be, or may include, a two-dimensional array of depth values. Depth map 502 may be generated according to any suitable technique, including, as examples, a time-of-flight (ToF) technique (e.g., as described with regard to FIG. 1), an active depth-sensing technique (e.g., as described with regard to FIG. 2), and/or a stereo-vision technique (e.g., as described with regard to FIG. 3 and FIG. 4).

Confidence values 504 may be, or may include, confidence values corresponding to depth values of depth map 502. For example, each of confidence values 504 may correspond to a respective depth value of depth map 502. Confidence values 504 may be arranged as a confidence map, for example, as a two-dimensional array having the same dimensions as depth map 502. Confidence values 504 may be determined by the same technique that determined depth map 502. For example, as each depth value of depth map 502 is determined, a corresponding confidence value of confidence values 504 may be determined.

As an example of generating confidence values 504, as a ToF technique determines depth values of depth map 502, the ToF technique may determine a confidence value for each depth value of depth map 502 based on a return signal on which the depth value is based. For example, the ToF technique may determine a confidence value based on a correlation between the projected signal and the return signal and/or based on a signal strength of the return signal. As another example, as an active-depth-sensing technique determines depth values of depth map 502, the active-depth-sensing technique may determine a confidence value for each depth value based on a match score (e.g., a score describing a correlation between a projected pattern and the pattern as captured in an image of the environment). As another example, as a stereo-vision technique determines depth values of depth map 502, the stereo-vision technique may determine a confidence value for each depth value based on a cost (e.g., a cost describing a correlation between features of stereoscopically-paired images).

Depth smoothing engine 506 may modify depth values of depth map 502 based on confidence values 504 to generate smoothed depth map 508. In some cases, depth smoothing engine 506 may smooth depth values of depth map 502. Smoothing depth values may include modifying a depth value based on neighboring depth values, for example, to cause the depth value to be more similar to the neighboring depth values, Smoothing may cause smoothed depth values to be more accurate, for example, in cases in which the smoothed depth value and the neighboring depth values are all based on depth measurements from an object or surface that is the same distance from the sensor which captured the depth measurements. For example, smoothing may remove outlier depth values.

Additionally or alternatively, depth smoothing engine 506 may fill depth holes in depth map 502. For example, in some cases, the two-dimensional array of depth values may include gaps. For example, warping of a depth map or sampling depth measurements by a depth sensor at a resolution that is lower than the desired resolution of the desired depth map may result in depth holes in depth map 502. Depth smoothing engine 506 may fill depth holes by generating a depth value to fill the depth hole based on neighboring depth values.

Depth smoothing engine 506 may smooth depth values of depth map 502 and/or fill depth holes of depth map 502 based on confidence values 504. For example, depth smoothing engine 506 may divide depth map 502 into depth sections and determine a section confidence for each of the depth sections. Further, depth smoothing engine 506 may smooth and/or fill depth holes in low-confidence depth sections and skip smoothing and/or filling depth holes in high-confidence depth sections.

FIG. 6 is a diagram illustrating examples of various concepts related to systems and techniques for modifying depth values according to various aspects of the present disclosure. For example, FIG. 6 includes an illustration of an example depth map 602, an illustration of an example confidence map 612 corresponding to depth map 602, an example of depth sections 622, an example of confidence sections 632, an example of section confidences 640, an example of a filter 650, and an example of a smoothed depth map 660.

Depth map 602 may be an example of depth map 502 of FIG. 5. Depth map 602 may be a two-dimensional array of depth values. A depth value 604 is given as an example of a depth value of depth value 604 for descriptive purposes. Further, depth map 602 may include depth holes (e.g., points of the two-dimensional array that lack depth values). Depth hole 606 is given as an example of such a depth hole in depth map 602.

Confidence map 612 may be an example of confidence values 504 of FIG. 5. Confidence map 612 may be a two-dimensional array of confidence values corresponding to depth values of depth map 602. Each confidence value of confidence map 612 may correspond to a respective depth value of depth map 602. Each confidence value may represent a confidence of a technique that generated depth map 602 in a corresponding depth value of depth map 602. Confidence map 612 may have the same dimensions as depth map 602 such that confidence values of confidence map 612 may be in the same position in confidence map 612 as their corresponding depth values are in depth map 602. For example, a confidence value at a position (1, 1) in the two-dimensional array of confidence map 612 may correspond to a depth value at a position (1, 1) in the two-dimensional array of depth map 602.

Systems and techniques (e.g., depth smoothing engine 506 of FIG. 5) may divide depth map 602 into depth sections 622. For example, depth smoothing engine 506 may draw a number of horizontal and/or vertical lines dividing depth map 602 into rectangular depth sections 622. In some aspects, each of depth sections 622 may have the same dimensions (or substantially the same dimensions). In other aspects, depth sections 622 may have various sizes. Depth section 624 and depth section 626 are given as examples of depth sections 622 for descriptive purposes.

In some aspects, depth smoothing engine 506 may determine sizes for depth sections 622 based on confidence map 612. For example, depth smoothing engine 506 may determine that depth map 602 includes many (e.g., more than half) high-confidence depth values based on a ratio of high-confidence confidence values of confidence map 612 to the total number of confidence map 612. Based on determining that depth map 602 includes many high-confidence depth values, depth smoothing engine 506 may determine to divide depth map 602 into large depth sections 622. Large depth sections 622 may allow depth smoothing engine 506 to skip large depth sections 622 when determining to skip the modifying of high-confidence depth sections. Skipping large depth sections may improve efficiency of smoothing depth values (e.g., by decreasing the power consumption and/or processing time of smoothing the depth values).

Alternatively, depth smoothing engine 506 may determine that depth map 602 includes few (e.g., fewer than half) high-confidence depth values based on a ratio of high-confidence confidence values of confidence map 612 to the total number of confidence map 612. Based on determining that depth map 602 includes few high-confidence depth values, depth smoothing engine 506 may determine to divide depth map 602 into small depth sections 622. Small depth sections 622 may allow depth smoothing engine 506 to skip more depth sections 622 when determining to skip modifying of high-confidence depth sections, for example, because if depth sections 622 were smaller, confidence sections 632 would also be smaller and more of confidence sections 632 may include only high confidence values. Skipping many small depth sections may improve efficiency of smoothing depth values (e.g., by decreasing the power consumption and/or processing time of smoothing the depth values).

In some aspects, depth smoothing engine 506 may divide confidence map 612 into confidence sections 632. Confidence sections 632 may correspond to depth sections 622. For example, confidence section 634 (which is given as an example one of confidence sections 632) may correspond to depth section 624. In particular, confidence section 634 may include confidence values of the depth values of depth section 624. In some aspects, dividing confidence map 612 into confidence sections 632 may be, or may include, identifying confidence values that correspond to depth values of depth sections 622 (e.g., without modifying confidence map 612).

Depth smoothing engine 506 may determine section confidences 640, which may include a section confidence for each of depth sections 622. Each of section confidences 640 may be based on a statistical measure of the confidence values of the corresponding confidence sections 632. For example, depth section 624 may have section confidence 644 (which is given as an example one of section confidences 640) based on a statistical measure of the confidence values of confidence section 634 (e.g., based on confidence section 634 corresponding to depth section 624). As another example, depth section 626 may have section confidence 646 based on the statistical measure of the confidence values of confidence section 636. The statistical measure may be, for example, a threshold, a programmable threshold, a minimum, an average, a 25% point (e.g., a point 25% between a minimum value and a maximum value), etc.

Depth section 624 may be a high-confidence depth section based on the confidence values of confidence section 634 and/or section confidence 644 satisfying a confidence criteria. For example, section confidence 644 of depth section 624 may be 1 based on a minimum or average confidence value of confidence section 634 being 1. Further, depth section 624 may be determined to be a high-confidence depth section based on section confidence 644 exceeding a confidence threshold (e.g., 0.75). Depth section 626 may be a low-confidence depth section based on the confidence values of confidence section 636 and/or section confidence 646 not satisfying the confidence criteria. For example, section confidence 646 of depth section 626 may be 0.4 based on an average confidence value of confidence section 636 being 0.4. Further, depth section 626 may be determined to be a low-confidence depth section based on section confidence 646 not exceeding the confidence threshold (e.g., 0.75).

Depth smoothing engine 506 may determine to modify depth values of depth map 602 based on confidence map 612, and more specifically based on section confidences 640. For example, depth smoothing engine 506 may determine to modify depth values some of depth sections 622 based on the section confidences of the depth sections and to not modify depth values of others of depth sections 622 based on the section confidences of the other depth sections. For example, depth smoothing engine 506 may determine to modify the depth values of depth section 626 based on section confidence 646. Further, depth smoothing engine 506 may determine to not modify the depth values of depth section 624 bases on section confidence 644.

Filter 650 is given as an example filter that may be used to modify depth values of depth map 602. Filter 650 may be a two-dimensional smoothing filter. Filter 650 may be applied to neighborhoods of depth values to determine a new value for a center depth value of the neighborhood of depth values. Additionally or alternatively, filter 650 may be applied to depth values surrounding a depth hole to determine a depth value for the depth hole. For example, filter 650 may be applied to pixels surrounding depth hole 606 to determine a depth value to replace depth hole 606. In some aspects, the filter 650 may be normalized. Alternatively, any new value determined based on filter 650 may be normalized. Another example two-dimensional filter (not illustrated) would be an equally-weighted average filter where each value of filter 650 is 1. Other filters can also be used including filters where the coefficients (weights) are determined on the fly.

Smoothed depth map 660 is an example of a modified version of depth map 602. Smoothed depth map 660 is an example of smoothed depth map 508 of FIG. 5. Smoothed depth map 660 may include depth values that have been smoothed and/or depth values that fill depth holes in depth map 602. For example, smoothed depth map 660 may include a depth value at the position of depth hole 606.

Figure 7:
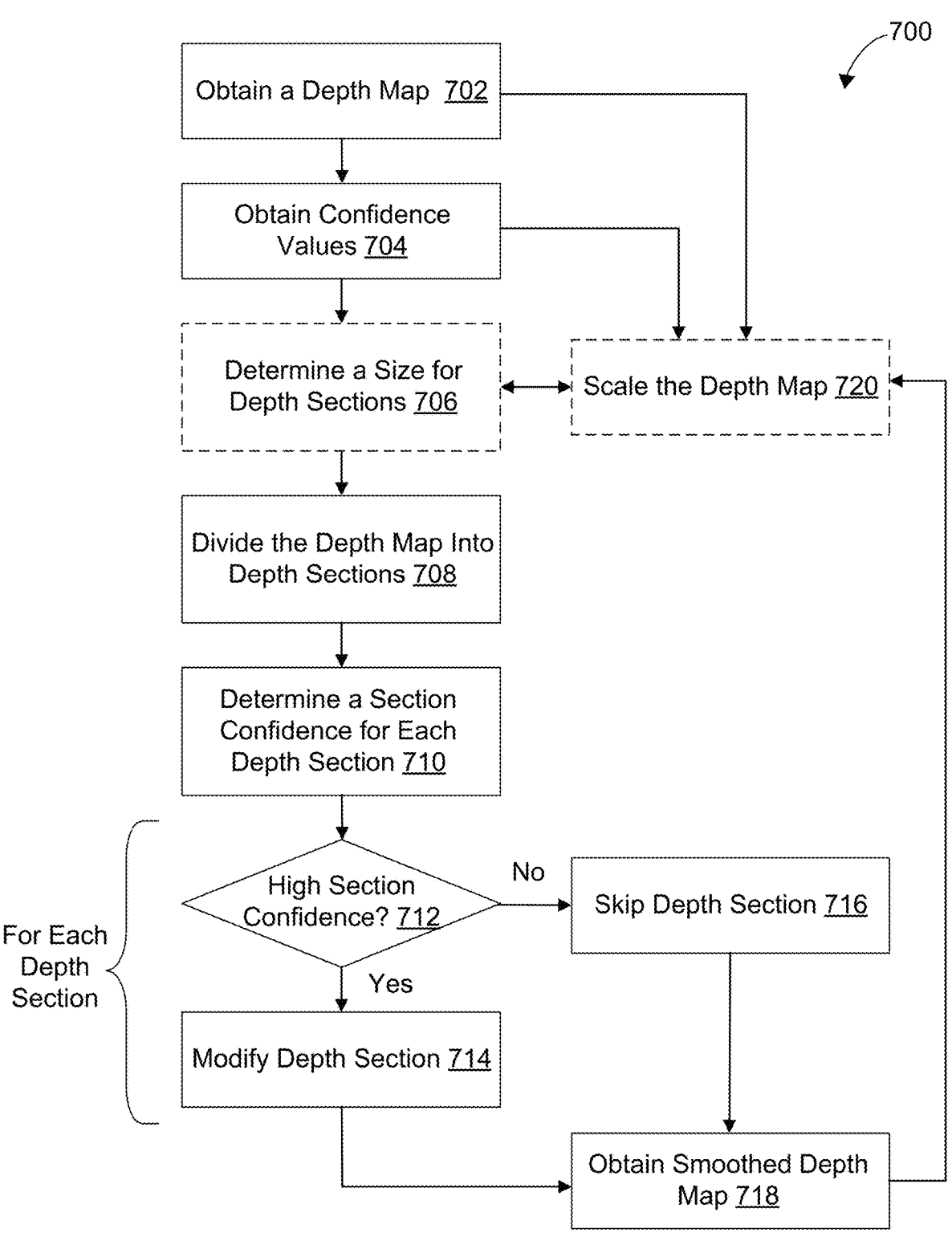
FIG. 7 is a flow diagram illustrating an example process for modifying depth values, according to various aspects of the present disclosure.

FIG. 7 is a flow diagram illustrating an example process 700 for modifying depth values, according to various aspects of the present disclosure. One or more operations of process 700 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 700. The one or more operations of process 700 may be implemented as software components that are executed and run on one or more processors.

At block 702, a depth map may be obtained. For example, depth smoothing engine 506 of FIG. 5 may obtain depth map 502 of FIG. 5 or depth map 602 of FIG. 6.

At block 704, confidence values corresponding to the depth values may be obtained. For example, depth smoothing engine 506 may obtain confidence values 504 of FIG. 5 or confidence map 612 of FIG. 6. Block 702 and block 704 may occur in any order or at the same time.

In some aspects, at block 706, sizes may be determined for depth sections. For example, depth smoothing engine 506 may determine sizes of depth sections 622 based on confidence map 612. For instance, depth smoothing engine 506 may determine a relationship (e.g., a ratio) between high confidence values of confidence map 612 and the total number confidence values of confidence map 612 and determine sizes for depth sections 622 based on the relationship. In other aspects, block 706 may be omitted and the sizes of the depth sections may be predetermined. The optional nature of block 706 in process 700 is illustrated by block 706 being illustrated using dashed lines.

At block 708, the depth map may be divided into depth sections. Dividing the depth map may be, or may include, identifying the sections (e.g., without altering the depth map). For example, depth smoothing engine 506 may divide depth map 602 into depth sections 622.

At block 710, a section confidence may be determined for each of the depth sections. For example, a section confidence may be determined based on a statistical measure of all of the confidence values of all of the depth values of a given depth section. For example, section confidence 644 may be determined for depth section 624 based on a statistical measure of all confidence values of confidence section 634, which corresponds to depth section 624. The statistical measure may be, for example, a minimum, an average, a 25% point (e.g., a point 25% between a minimum value and a maximum value), etc. For example, depth smoothing engine 506 may determine one of section confidences 640 for each of depth sections 622.

At a decision block 712, which may be repeated for each depth section, a determination may be made regarding whether each of the depth sections is a high-confidence depth section or not. For example, the section confidences determined at block 710 may be compared to a confidence threshold and the determination regarding whether each of the depth sections is a high-confidence depth section may be made based on the comparison. For example, depth smoothing engine 506 may compare section confidences 640 to a confidence threshold.

Each low-confidence depth section (e.g., depth section not identified as a high-confidence depth section at decision block 712), may be modified at block 714. For example, each low-confidence depth section may be smoothed and/or have depth holes filled. For example, depth smoothing engine 506 may apply a filter (e.g., filter 650) to depth values of low-confidence depth sections of depth sections 622.

Each high-confidence depth section (e.g., depth section identified as a high-confidence depth section at decision block 712), may be skipped at block 716. For example, depth values of each high-confidence depth section may not be modified (e.g., as the depth values of low-confidence depth sections are modified at block 714).

Once all of the low-confidence depth sections are modified, the result may be a smoothed depth map. For illustrative purposes, block 718 is meant to illustrate the completion of the modifying of the low-confidence depth sections. For example, after depth smoothing engine 506 has modified depth values of low-confidence depth sections of depth sections 622, the result may be smoothed depth map 660.

Process 700 may be performed a number of times and/or at a number of different resolutions. For example, the depth map obtained at block 702 may have a first resolution (e.g., including a first number of depth values representing the depths of points in the scene). Similarly, the confidence map obtained at block 704 may have the first resolution. Process 700 may include scaling the depth map and the confidence map to a second resolution prior to determining depth sections, the section confidences and/or which depth sections to modify. For example, rather than determining the section confidences based on each confidence value of each respective depth value, process 700 may determine section confidences based on groups of confidence values based on the scaling of the depth map. For instance, process 700 may include scaling the depth map obtained at block 702 and the confidence map obtained at block 704 to the second resolution (e.g., including a second number, for example, one quarter the first number of depth values representing the depths of the points in the scene). While, or at substantially the same time that, the depth map and the confidence map are being rescaled, process 700 may determine the depth sections, the section confidences, and/or which depth sections to modify based on the depth map and confidence map as they are being accessed to be scaled. After determining which depth sections to modify, process 700 may include modifying each depth values of each of the low-confidence depth sections. Finally, process 700 may include rescaling the modified depth map back to the first resolution.

By determining which depth sections to modify while the depth map and confidence map are being scaled, process 700 may conserve computing operations compared to other processes that may determine whether to modify each depth value independently by accessing each depth value of the depth map individually. For example, by determining which depth sections to skip while the depth maps are being accessed for scaling, the systems and techniques may determine to skip depth sections without having to access each of the depth values of the depth map an additional time.

Further, as mentioned previously, process 700 may be performed a number of times (e.g., at a different resolution each time). For example, after the depth map is received, the depth map may be scaled a first time to a low resolution. The depth sections and the section confidences may be determined based on the low-resolution depth map. The low-resolution depth map may then be modified (e.g., smoothed and/or have holes filled). The modified low-resolution depth map may be used by another process. For example, another process or technique may determine features based on the modified low-resolution depth map. The smoothed depth map may then be scaled to a higher resolution (e.g., back to the original resolution).

Additionally, process 700 may include determining whether to modify individual depth values within low-confidence depth sections based on the respective confidence values of individual depth values. For example, having determined that a depth section (e.g., depth section 626) is a low-confidence depth section, and having determined to modify the depth section, process 700 may include determining to modify the low-confidence depth values of the depth section and to skip modifying the high-confidence depth values.

FIG. 8 is a flow diagram illustrating an example process 800 for modifying depth values, in accordance with aspects of the present disclosure. One or more operations of process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 800. The one or more operations of process 800 may be implemented as software components that are executed and run on one or more processors.

At block 802, a computing device (or one or more components thereof) may obtain a depth map comprising a plurality of depth values. For example, depth smoothing engine 506 of system 500 of FIG. 5 may obtain depth map 502. Depth map 502 may be, or may include, a plurality of depth values arranged as depth map 502.

At block 804, the computing device (or one or more components thereof) may obtain a plurality of confidence values comprising a respective confidence value for each depth value of the plurality of depth values. For example, depth smoothing engine 506 of system 500 of FIG. 5 may confidence values 504 may be, or may include, a plurality of confidence values, in which each of confidence values 504 corresponds to one of depth map 502.

At block 806, the computing device (or one or more components thereof) may divide the depth map into a plurality of depth sections. For example, depth smoothing engine 506 of system 500 of FIG. 5 may divide depth map 502 into depth sections. For example, depth smoothing engine 506 may divide depth map 602 into depth sections 622 of FIG. 6.

In some aspects, the computing device (or one or more components thereof) may determine a size for each of the plurality of depth sections based on the plurality of confidence values. For example, in some aspects, depth smoothing engine 506 of FIG. 5 may determine a size of confidence sections 632 into which to divide confidence map 612. In some aspects, depth smoothing engine 506 may determine the size of confidence sections 632 based on confidence values of confidence map 612. In some aspects, the computing device (or one or more components thereof) may determine a size for each of the plurality of depth sections based on a count of low-confidence depth values, wherein the low-confidence depth values correspond to respective confidence values that are less than a confidence threshold. For example, in some aspects, depth smoothing engine 506 of FIG. 5 may determine a size of confidence sections 632 into which to divide confidence map 612 based on a count of low-confidence depth values of depth map 602. In such aspects, low-confidence depth values may be defined based on confidence values corresponding to the low-confidence depth values. Thus, in some aspects, depth smoothing engine 506 may determine the size of confidence sections 632 based on confidence values of confidence map 612. For example, depth smoothing engine 506 may determine the size of confidence sections 632 based on a count of confidence values of confidence map 612 that are less than a threshold. For example, confidence values illustrated as white pixels in confidence map 612 may be low confidence values because such confidence values may be lower than a confidence threshold. Such low confidence depth values may be indicative of low-confidence depth values. Depth smoothing engine 506 may use a count of the low confidence values to determine a size of confidence sections 632.

At block 808, the computing device (or one or more components thereof) may determine, based on the plurality of confidence values, a plurality of section confidences comprising a respective section confidence for each of the plurality of depth sections. For example, depth smoothing engine 506 of system 500 of FIG. 5 may determine section confidences 640 of each of confidence sections 632 of FIG. 6 based on confidence values confidence map 612 of FIG. 6.

In some aspects, a section confidence of a depth section may be determined based on a statistical measure of confidence values of depth values of the depth section. For example, section confidence 646 of depth value depth section 626 may be determined based on a statistical measure of confidence values of confidence section 636. For example, section confidence 646 of depth value depth section 626 may be determined based on a threshold, a programmable threshold, a minimum, an average, and/or a 25% point (e.g., a point 25% between a minimum value and a maximum value), of all of the confidence values of confidence section 636. In some aspects, the statistical measure may be based on at least one of: an average of the confidence values; or a minimum of the confidence values.

At block 810, the computing device (or one or more components thereof) may modify the depth map based on the plurality of section confidences. For example, depth smoothing engine 506 of system 500 of FIG. 5 may modify depth map 502 based on the plurality of section confidences.

In some aspects, to modify the depth map based on the plurality of section confidences, the computing device (or one or more components thereof) may modify low-confidence depth sections, each of the low-confidence depth sections having a respective section confidence less than a section-confidence threshold; and skip modifying of high-confidence depth sections, each of the high-confidence depth sections having a respective section confidence greater than the section-confidence threshold. For example, depth smoothing engine 506 of system 500 of FIG. 5 may modify depth values of depth section 626 of FIG. 6 based on section confidence 646 of FIG. 6 being below a threshold. Further, depth smoothing engine 506 may skip modifying depth values of depth section 624 of FIG. 6 based on section confidence 644 of FIG. 6 being greater than a threshold.

In some aspects, to modify the depth map, the computing device (or one or more components thereof) may apply a two-dimensional filter to depth values of the depth map. For example, depth smoothing engine 506 of system 500 of FIG.

5 may apply filter 650 of FIG. 6 to depth values depth section 626. In some aspects, to modify the depth map, the computing device (or one or more components thereof) may apply a weighted-averaging filter to depth values of the depth map. For example, depth smoothing engine 506 may apply a weighted-averaging filter to depth values of depth section 626. In some aspects, to modify the depth map, the computing device (or one or more components thereof) may apply a smoothing filter to depth values of the depth map. For example, depth smoothing engine 506 may apply a smoothing filter to depth values of depth section 626.

In some aspects, to modify the depth map, the computing device (or one or more components thereof) may generate filling depth values for one or more depth holes in the depth map based on neighboring depth values. For example, depth smoothing engine 506 may generate a depth value for depth hole 606 of depth map 602 of FIG. 6. In some aspects, the depth map may be, or may include, a two-dimensional array of depth values; the one or more depth holes may be, or may include, respective points in the two-dimensional array that lack respective depth values; the neighboring depth values may be, or may include, depth values in the two-dimensional array that are adjacent to one or more respective depth holes; and to generating the filling depth values for the one or more depth holes in the depth map, the computing device (or one or more components thereof) may determine a respective filling depth value for each depth hole based on respective neighboring depth values of each depth hole. For example, depth map 602 may be, or may include, a two-dimensional array of depth values. Depth hole 606 may be an example of a lack of a depth value in the two-dimensional array of depth values. Depth smoothing engine 506 may use depth values adjacent to depth hole 606 to determine a depth value to use for depth hole 606. In some aspects, the filling depth values may be generated by applying a two-dimensional filter to the neighboring depth values. For example, depth smoothing engine 506 may apply a two-dimensional filter to depth values that neighbor depth hole 606 to determine a depth value for depth hole 606.

In some examples, as noted previously, the methods described herein (e.g., process 700 of FIG. 7, process 800 of FIG. 8, and/or other methods described herein) can be performed, in whole or in part, by a computing device or apparatus. In one example, one or more of the methods can be performed by system 500 of FIG. 5, depth smoothing engine 506 of FIG. 5, or by another system or device. In another example, one or more of the methods (e.g., process 700, process 800, and/or other methods described herein) can be performed, in whole or in part, by the computing-device architecture 900 shown in FIG. 9. For instance, a computing device with the computing-device architecture 900 shown in FIG. 9 can include, or be included in, the components of the system 500 and/or depth smoothing engine 506 and can implement the operations of process 700 and/or process 800, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 700, process 800, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 700, process 800, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 9:
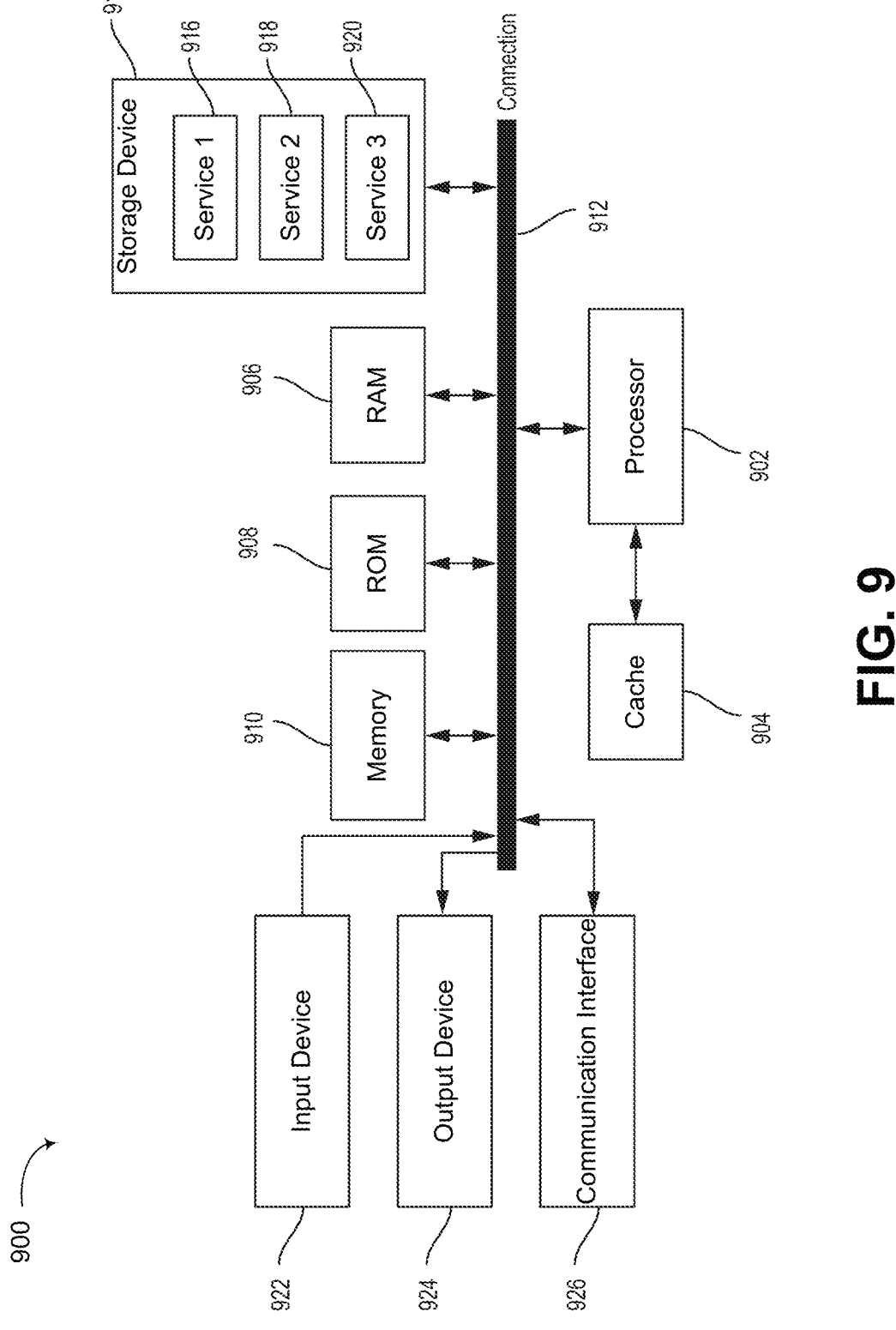
FIG. 9 is a block diagram illustrating an example computing-device architecture of an example computing device which can implement the various techniques described herein.

FIG. 9 illustrates an example computing-device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 900 may include, implement, or be included in any or all of system 500 of FIG. 5 and/or depth smoothing engine 506 of FIG. 5. Additionally or alternatively, computing-device architecture 900 may be configured to perform process 800, and/or other process described herein.

The components of computing-device architecture 900 are shown in electrical communication with each other using connection 912, such as a bus. The example computing-device architecture 900 includes a processing unit (CPU or processor) 902 and computing device connection 912 that couples various computing device components including computing device memory 910, such as read only memory (ROM) 908 and random-access memory (RAM) 906, to processor 902.

Computing-device architecture 900 can include a cache of high-speed memory connected directly with, in close proximity to, or integrated as part of processor 902. Computing-device architecture 900 can copy data from memory 910 and/or the storage device 914 to cache 904 for quick access by processor 902. In this way, the cache can provide a performance boost that avoids processor 902 delays while waiting for data. These and other modules can control or be configured to control processor 902 to perform various actions. Other computing device memory 910 may be available for use as well. Memory 910 can include multiple different types of memory with different performance characteristics. Processor 902 can include any general-purpose processor and a hardware or software service, such as service 1 916, service 2 918, and service 3 920 stored in storage device 914, configured to control processor 902 as well as a special-purpose processor where software instructions are incorporated into the processor design. Processor 902 may be a self-contained system, containing multiple cores or processors, a bus, memory controller, cache, etc. A multi-core processor may be symmetric or asymmetric.

To enable user interaction with the computing-device architecture 900, input device 922 can represent any number of input mechanisms, such as a microphone for speech, a touch-sensitive screen for gesture or graphical input, keyboard, mouse, motion input, speech and so forth. Output device 924 can also be one or more of a number of output mechanisms known to those of skill in the art, such as a display, projector, television, speaker device, etc. In some instances, multimodal computing devices can enable a user to provide multiple types of input to communicate with computing-device architecture 900. Communication interface 926 can generally govern and manage the user input and computing device output. There is no restriction on operating on any particular hardware arrangement and therefore the basic features here may easily be substituted for improved hardware or firmware arrangements as they are developed.

Storage device 914 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 906, read only memory (ROM) 908, and hybrids thereof. Storage device 914 can include services 916, 918, and 920 for controlling processor 902. Other hardware or software modules are contemplated. Storage device 914 can be connected to the computing device connection 912. In one aspect, a hardware module that performs a particular function can include the software component stored in a computer-readable medium in connection with the necessary hardware components, such as processor 902, connection 912, output device 924, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for modifying depth maps, the apparatus comprising: at least one memory; and at least one processor coupled to the at least one memory and configured to: obtain a depth map comprising a plurality of depth values; obtain a plurality of confidence values comprising a respective confidence value for each depth value of the plurality of depth values; divide the depth map into a plurality of depth sections; determine, based on the plurality of confidence values, a plurality of section confidences comprising a respective section confidence for each of the plurality of depth sections; and modify the depth map based on the plurality of section confidences.

Aspect 2. The apparatus of aspect 1, wherein, to modify the depth map based on the plurality of section confidences, the at least one processor is configured to: modify low-confidence depth sections, each of the low-confidence depth sections having a respective section confidence less than a section-confidence threshold; and skip modifying of high-confidence depth sections, each of the high-confidence depth sections having a respective section confidence greater than the section-confidence threshold.

Aspect 3. The apparatus of any one of aspects 1 or 2, wherein, to modify the depth map, the at least one processor is configured to apply a two-dimensional filter to depth values of the depth map.

Aspect 4. The apparatus of any one of aspects 1 to 3, wherein, to modify the depth map, the at least one processor is configured to apply a weighted-averaging filter to depth values of the depth map.

Aspect 5. The apparatus of any one of aspects 1 to 4, wherein, to modify the depth map, the at least one processor is configured to apply a smoothing filter to depth values of the depth map.

Aspect 6. The apparatus of any one of aspects 1 to 5, wherein, to modify the depth map, the at least one processor is configured to generate filling depth values for one or more depth holes in the depth map based on neighboring depth values.

Aspect 7. The apparatus of aspect 6, wherein: the depth map comprises a two-dimensional array of depth values; the one or more depth holes comprise respective points in the two-dimensional array that lack respective depth values; the neighboring depth values comprise depth values in the two-dimensional array that are adjacent to one or more respective depth holes; and to generating the filling depth values for the one or more depth holes in the depth map, the at least one processor is configured to determine a respective filling depth value for each depth hole based on respective neighboring depth values of each depth hole.

Aspect 8. The apparatus of aspect 7, wherein the filling depth values are generated by applying a two-dimensional filter to the neighboring depth values.

Aspect 9. The apparatus of any one of aspects 1 to 8, wherein a section confidence of a depth section is determined based on a statistical measure of confidence values of depth values of the depth section.

Aspect 10. The apparatus of aspect 9, wherein the statistical measure is based on at least one of: an average of the confidence values; or a minimum of the confidence values.

Aspect 11. The apparatus of any one of aspects 1 to 10, wherein the at least one processor is further configured to determine a size for each of the plurality of depth sections based on the plurality of confidence values.

Aspect 12. The apparatus of any one of aspects 1 to 11, wherein the at least one processor is further configured to determine a size for each of the plurality of depth sections based on a count of low-confidence depth values, wherein the low-confidence depth values correspond to respective confidence values that are less than a confidence threshold.

Aspect 13. A method for modifying depth maps, the method comprising: obtaining a depth map comprising a plurality of depth values; obtaining a plurality of confidence values comprising a respective confidence value for each depth value of the plurality of depth values; dividing the depth map into a plurality of depth sections; determining, based on the plurality of confidence values, a plurality of section confidences comprising a respective section confidence for each of the plurality of depth sections; and modifying the depth map based on the plurality of section confidences.

Aspect 14. The method of aspect 13, wherein modifying the depth map based on the plurality of section confidences comprises: modifying low-confidence depth sections, each of the low-confidence depth sections having a respective section confidence less than a section-confidence threshold; and skipping modifying of high-confidence depth sections, each of the high-confidence depth sections having a respective section confidence greater than the section-confidence threshold.

Aspect 15. The method of any one of aspects 13 or 14, wherein modifying the depth map comprises applying a two-dimensional filter to depth values of the depth map.

Aspect 16. The method of any one of aspects 13 to 15, wherein modifying the depth map comprises applying a weighted-averaging filter to depth values of the depth map.

Aspect 17. The method of any one of aspects 13 to 16, wherein modifying the depth map comprises applying a smoothing filter to depth values of the depth map.

Aspect 18. The method of any one of aspects 13 to 17, wherein modifying the depth map comprises generating filling depth values for one or more depth holes in the depth map based on neighboring depth values.

Aspect 19. The method of aspect 18, wherein: the depth map comprises a two-dimensional array of depth values; the one or more depth holes comprise respective points in the two-dimensional array that lack respective depth values; the neighboring depth values comprise depth values in the two-dimensional array that are adjacent to one or more respective depth holes; and generating the filling depth values for the one or more depth holes in the depth map comprises determining a respective filling depth value for each depth hole based on respective neighboring depth values of each depth hole.

Aspect 20. The method of aspect 19, wherein the filling depth values are generated by applying a two-dimensional filter to the neighboring depth values.

Aspect 21. The method of any one of aspects 13 to 20, wherein a section confidence of a depth section is determined based on a statistical measure of confidence values of depth values of the depth section.

Aspect 22. The method of aspect 21, wherein the statistical measure is based on at least one of: an average of the confidence values; or a minimum of the confidence values.

Aspect 23. The method of any one of aspects 13 to 22, further comprising determining a size for each of the plurality of depth sections based on the plurality of confidence values.

Aspect 24. The method of any one of aspects 13 to 23, further comprising determining a size for each of the plurality of depth sections based on a count of low-confidence depth values, wherein the low-confidence depth values correspond to respective confidence values that are less than a confidence threshold.

Aspect 25. A non-transitory computer-readable storage medium having stored thereon instructions that, when executed by at least one processor, cause the at least one processor to perform operations according to any of aspects 13 to 24.

Aspect 26. An apparatus for providing virtual content for display, the apparatus comprising one or more means for perform operations according to any of aspects 13 to 24.

What is claimed is:

1. An apparatus for modifying depth maps, the apparatus comprising:
   at least one memory; and
   at least one processor coupled to the at least one memory and configured to:
   obtain a depth map comprising a plurality of depth values;
   obtain a plurality of confidence values comprising a respective confidence value for each depth value of the plurality of depth values;
   divide the depth map into a plurality of depth sections;
   determine, based on the plurality of confidence values, a plurality of section confidences comprising a respective section confidence for each of the plurality of depth sections; and
   modify the depth map based on the plurality of section confidences, wherein to modify the depth map, the at least one processor is configured to modify low-confidence depth sections, each of the low-confidence depth sections having a respective section confidence less than a section-confidence threshold, and skip modifying of high-confidence depth sections, each of the high-confidence depth sections having a respective section confidence greater than the section-confidence threshold.

2. The apparatus of claim 1, wherein, to modify the depth map, the at least one processor is configured to apply a two-dimensional filter to depth values of the depth map.

3. The apparatus of claim 1, wherein, to modify the depth map, the at least one processor is configured to apply a weighted-averaging filter to depth values of the depth map.

4. The apparatus of claim 1, wherein, to modify the depth map, the at least one processor is configured to apply a smoothing filter to depth values of the depth map.

5. The apparatus of claim 1, wherein, to modify the depth map, the at least one processor is configured to generate filling depth values for one or more depth holes in the depth map based on neighboring depth values.

6. The apparatus of claim 5, wherein:

the depth map comprises a two-dimensional array of depth values;

the one or more depth holes comprise respective points in the two-dimensional array that lack respective depth values;

the neighboring depth values comprise depth values in the two-dimensional array that are adjacent to one or more respective depth holes; and to generating the filling depth values for the one or more depth holes in the depth map, the at least one processor is configured to determine a respective filling depth value for each depth hole based on respective neighboring depth values of each depth hole.

7. The apparatus of claim 6, wherein the filling depth values are generated by applying a two-dimensional filter to the neighboring depth values.

8. The apparatus of claim 1, wherein a section confidence of a depth section is determined based on a statistical measure of confidence values of depth values of the depth section.

9. The apparatus of claim 8, wherein the statistical measure is based on at least one of:

an average of the confidence values; or a minimum of the confidence values.

10. The apparatus of claim 1, wherein the at least one processor is further configured to determine a size for each of the plurality of depth sections based on the plurality of confidence values.

11. The apparatus of claim 1, wherein the at least one processor is further configured to determine a size for each of the plurality of depth sections based on a count of low-confidence depth values, wherein the low-confidence depth values correspond to respective confidence values that are less than a confidence threshold.

12. A method for modifying depth maps, the method comprising:

obtaining a depth map comprising a plurality of depth values;

obtaining a plurality of confidence values comprising a respective confidence value for each depth value of the plurality of depth values;

dividing the depth map into a plurality of depth sections;

determining, based on the plurality of confidence values, a plurality of section confidences comprising a respective section confidence for each of the plurality of depth sections; and modifying the depth map based on the plurality of section confidences, wherein modifying the depth map comprises modifying low-confidence depth sections, each of the low-confidence depth sections having a respective section confidence less than a section-confidence threshold, and skipping modifying of high-confidence depth sections, each of the high-confidence depth sections having a respective section confidence greater than the section-confidence threshold.

13. The method of claim 12, wherein modifying the depth map comprises applying a smoothing filter to depth values of the depth map.

14. The method of claim 12, wherein modifying the depth map comprises generating filling depth values for one or more depth holes in the depth map based on neighboring depth values.

15. The method of claim 14, wherein:

the depth map comprises a two-dimensional array of depth values;

the one or more depth holes comprise respective points in the two-dimensional array that lack respective depth values;

the neighboring depth values comprise depth values in the two-dimensional array that are adjacent to one or more respective depth holes; and generating the filling depth values for the one or more depth holes in the depth map comprises determining a respective filling depth value for each depth hole based on respective neighboring depth values of each depth hole.

16. The method of claim 15, wherein the filling depth values are generated by applying a two-dimensional filter to the neighboring depth values.

17. The method of claim 12, further comprising determining a size for each of the plurality of depth sections based on the plurality of confidence values.

18. The method of claim 12, further comprising determining a size for each of the plurality of depth sections based on a count of low-confidence depth values, wherein the low-confidence depth values correspond to respective confidence values that are less than a confidence threshold.

* * * * *